(12) United States Patent
Hwang (10) Patent No.: US 11,525,377 B1
(45) Date of Patent: Dec. 13, 2022

(54) CONDENSED WATER DRAINAGE DEVICE AND EXHAUST SYSTEM OF A VEHICLE HAVING THE SAME

(71) Applicants: HYUNDAI MOTOR COMPANY, Seoul (KR); KIA CORPORATION, Seoul (KR)

(72) Inventor: Dae Gil Hwang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/554,849

(22) Filed: Dec. 17, 2021

(30) Foreign Application Priority Data

Jul. 9, 2021 (KR) .................. 10-2021-0090255

(51) Int. Cl.
*F01N 13/18* (2010.01)
*F01N 1/02* (2006.01)
*F01N 3/00* (2006.01)

(52) U.S. Cl.
CPC ............... *F01N 3/005* (2013.01); *F01N 1/02* (2013.01); *F01N 13/1805* (2013.01)

(58) Field of Classification Search
CPC .............................. F01N 2240/22; F01N 3/005
See application file for complete search history.

(56) References Cited

U.S. PATENT DOCUMENTS 2,818,131 A * 12/1957 Doughty ................ F01N 3/005
181/244

FOREIGN PATENT DOCUMENTS

KR   20080028137 A      3/2008
KR    2011056139 A  *   5/2011  ............. F01N 13/08

* cited by examiner

*Primary Examiner* — Anthony Ayala Delgado
(74) *Attorney, Agent, or Firm* — Lempia Summerfield Katz LLC (57) ABSTRACT

A condensed water drainage device of an exhaust system includes a casing having an inlet on a first side thereof and an outlet on a second side thereof and a deformable member coupled to the first side of the casing and configured to elastically and extendably deform. The drainage device includes a condensed water drainage member coupled to the deformable member to extend the deformable member by pressure of an exhaust gas introduced to the deformable member and having a condensed water drainage hole communicating with the outlet. The drainage device includes a stopper coupled to the second side of the casing to limit movement of the condensed water drainage member and to open or close the condensed water drainage hole according to extension or contraction of the deformable member.

14 Claims, 6 Drawing Sheets

CONDENSED WATER DRAINAGE DEVICE AND EXHAUST SYSTEM OF A VEHICLE HAVING THE SAME

CROSS-REFERENCE TO RELATED APPLICATION(S)

This application claims the benefit of and priority to Korean Patent Application No. 10-2021-0090255 filed on Jul. 9, 2021 in the Korean Intellectual Property Office, the disclosure of which is incorporated herein by reference in its entirety.

BACKGROUND

1. Field

The present disclosure relates to a condensed water drainage device for draining condensed water generated in an exhaust system of a vehicle and an exhaust system of a vehicle having the same.

2. Description of Related Art

In a vehicle, an internal combustion engine burns fuel mixed with air to generate rotational force. A large amount of combustion gas created in an engine operation process is purified through an exhaust system and released into the atmosphere.

An exhaust system of a vehicle includes an exhaust pipe allowing exhaust gas discharged from an engine to flow to a predetermined position in the vehicle. The exhaust system also includes a catalytic converter installed in the exhaust pipe to remove harmful substances contained in the exhaust gas. The exhaust system also includes a muffler installed in the exhaust pipe to lower pressure and temperature of the exhaust gas to reduce rapid expansion and exhaust noise of the exhaust gas.

Harmful exhaust discharged from the engine is converted into water vapor ($H_2O$), carbon dioxide ($CO_2$), and the like, in the process of being treated in a catalytic converter, so as to be discharged. Water vapor is condensed to form condensed water. Recently, as a catalytic function is improved due to the environmental problem of exhaust pollution caused by automobiles, condensed water is created in increased amounts.

In a normal case, condensed water inside a muffler may be drained externally from the muffler by a discharge pressure (exhaust pressure) of the exhaust gas. However, when the engine is idling, in a low revolutions per minute (RPM) region, a discharge pressure is lowered, and thus condensed water is not smoothly drained externally from the muffler.

When an outdoor temperature is low, such as in winter, in a cold region, or the like, the amount of condensed water produced increases. When the vehicle is kept in an idling state for a long time, condensed water accumulates in a lowest portion of the exhaust system. For example, a significant amount of condensed water may accumulate in the muffler or the condensed water produced in the muffler may overflow. Thus, a large amount of condensed water may accumulate in the exhaust pipe located at the bottom of the exhaust system.

In this state, if a large amount of condensed water remaining in the exhaust pipe is frozen such as when the vehicle is not running, i.e., the power is off, etc., a clogging phenomenon may occur in the exhaust pipe. In this case, it may be impossible to start an engine, defective starting may occur, or the exhaust system (muffler, etc.) may be deformed/damaged due to high exhaust pressure in the muffler. In particular, in the case of a hybrid vehicle, a motor driving mode in which even low-pressure exhaust gas is not discharged may occur frequently. Thus, the possibility of a problem of condensed water freezing increases due to the occurrence of a large amount of condensed water.

In order to solve this problem, a method of forming a drainage hole in a lower end (e.g., the exhaust pipe and/or the muffler) of the exhaust system where condensed water gathers has been proposed.

However, forming a hole exposed to the outside in the exhaust system may not only look bad but may also be unfavorable for a vehicle owner/operator. The exhaust system performs a function of noise reduction. However, even a small hole formed in the exhaust system may degrade noise, vibration, and harshness (NVH) performance such as noise and vibration.

Meanwhile, KR 2008-0028137 A proposed a drainage hole formed in a muffler such that condensed water accumulated in the muffler is drained during idling and low-speed driving of an engine. However, the related art has a problem in that an internal structure of the muffler should be drastically changed and cannot be applied to the exhaust pipe. In addition, since the drainage hole formed in the muffler remains exposed externally, it may still be unfavorable to users due to appearance and decreased NVH performance.

SUMMARY

Embodiments disclosed herein provide a condensed water drainage device and an exhaust system of a vehicle including the same. In the disclosed device and system, clogging of an exhaust pipe due to freezing of condensed water is prevented and noise and vibration during engine operation are reduced.

Embodiments disclosed herein provide a condensed water drainage device, which may be easily installed in an exhaust system and which is not overly restrictive with respect to a mounting portion thereof. Embodiments disclosed herein also provide an exhaust system for a vehicle having the same.

According to an aspect of the present disclosure, a condensed water drainage device of an exhaust system includes: a casing having an inlet on a first side thereof and an outlet on a second side thereof; a deformable member coupled to the first side of the casing configured to elastically and extendably deform; a condensed water drainage member coupled to the deformable member to extend the deformable member by pressure of an exhaust gas introduced to the deformable member, and having a condensed water drainage hole communicating with the outlet; and a stopper coupled to the second side of the casing to limit movement of the condensed water drainage member and to open or close the condensed water drainage hole according to extension or contraction of the deformable member.

One side of the deformable member and the stopper may be fixed to the casing and the condensed water drainage member may be movably accommodated in the casing.

The condensed water drainage member may move between an open position and a closed position. In the open position, the condensed water drainage member is spaced apart from the stopper and the condensed water drainage hole is at least partially opened. In the closed position, the condensed water drainage member is in contact with the stopper and the condensed water drainage hole is closed.

Also, in the open position, condensed water drained through the condensed water drainage hole may be drained externally through the outlet.

The deformable member may have a corrugated tube shape.

The deformable member may have a first opening formed on one side thereof and communicating with the inlet and a second opening formed on the other side thereof. The condensed water drainage member may have a shape partially covering the second opening. The condensed water drainage hole may have a diameter smaller than that of the second opening.

One side of the stopper may be inserted into the condensed water drainage hole in the open position. A portion of the stopper exposed to the outside of the condensed water drainage hole may have a sectional area greater than one side of the stopper inserted into the condensed water drainage hole. The stopper may have a step portion so as to be in surface contact with the condensed water drainage member in the closed position.

At least one of the deformable member, the casing, or the condensed water drainage member may be formed of a corrosion-resistant material or may be coated with a corrosion-resistant material. The stopper may be formed of a heat-resistant polymer.

In another aspect, an exhaust system for a vehicle includes an exhaust pipe through which exhaust gas discharged from an engine flows, a muffler connected to the exhaust pipe and reducing exhaust noise, and a condensed water drainage device. The drainage device is mounted on at least one of an outer surface of the exhaust pipe or an outer surface of the muffler and is installed to communicate with a drainage hole formed in the muffler or the exhaust pipe to drain condensed water. The condensed water drainage device includes a deformable member elastically extendable according to exhaust pressure of an exhaust gas introduced therein, a condensed water drainage member coupled to the deformable member and having a condensed water drainage hole, and a stopper opening or closing the condensed water drainage hole according to extension or contraction of the deformable member.

The drainage hole may be formed in a position of the exhaust pipe lower than other portions thereof. A mounting surface of the exhaust pipe on which the condensed water drainage device is installed forms a flat surface.

BRIEF DESCRIPTION OF DRAWINGS

The above and other aspects, features, and advantages of the present disclosure should be more clearly understood from the following detailed description, taken in conjunction with the accompanying drawings, in which:

FIGS. 6A and 6B are cross-sectional views of a condensed water drainage device taken along line I-I' in FIG. 2, in which

FIGS. 7A and 7B are cross-sectional views illustrating a modified example of the condensed water drainage device illustrated in FIGS. 6A and 6B, in which FIGS. 8A and 8B are views illustrating an operation state of a condensed water drainage device according to an embodiment of the present disclosure, wherein

DETAILED DESCRIPTION

Hereinafter, embodiments of the present disclosure are described with reference to accompanying drawings. However, the embodiments of the present disclosure may be modified in various other forms and the scope of the present disclosure is not limited to the embodiments described below.

In the present disclosure, a singular expression includes plural expressions unless context specifies otherwise. Also, the same reference numerals refer to the same elements or corresponding elements throughout the disclosure. In addition, shapes and sizes of elements in the drawings may be exaggerated for clearer description. When a component, device, element, or the like of the present disclosure is described as having a purpose or performing an operation, function, or the like, the component, device, or element should be considered herein as being "configured to" meet that purpose or perform that operation or function.

In this disclosure, a vehicle refers to various vehicles that move a transported object such as a person, an animal, or an object from a departure point to a destination. Such vehicles are not limited to vehicles traveling on roads or tracks.

The terms "front", "back", "lateral", "top and bottom", "above", "upper", "lower", "left and right", etc. are defined based on a vehicle or a vehicle body. In addition, terms such as "first" and "second" may be used to describe various components that are the same or similar. However, these components are not limited in order, size, location, and importance by such terms. Such terms are used and such components are so named only for the purpose of distinguishing one component from another.

Hereinafter, embodiments of the present disclosure are described with reference to the drawings.

Figure 1:
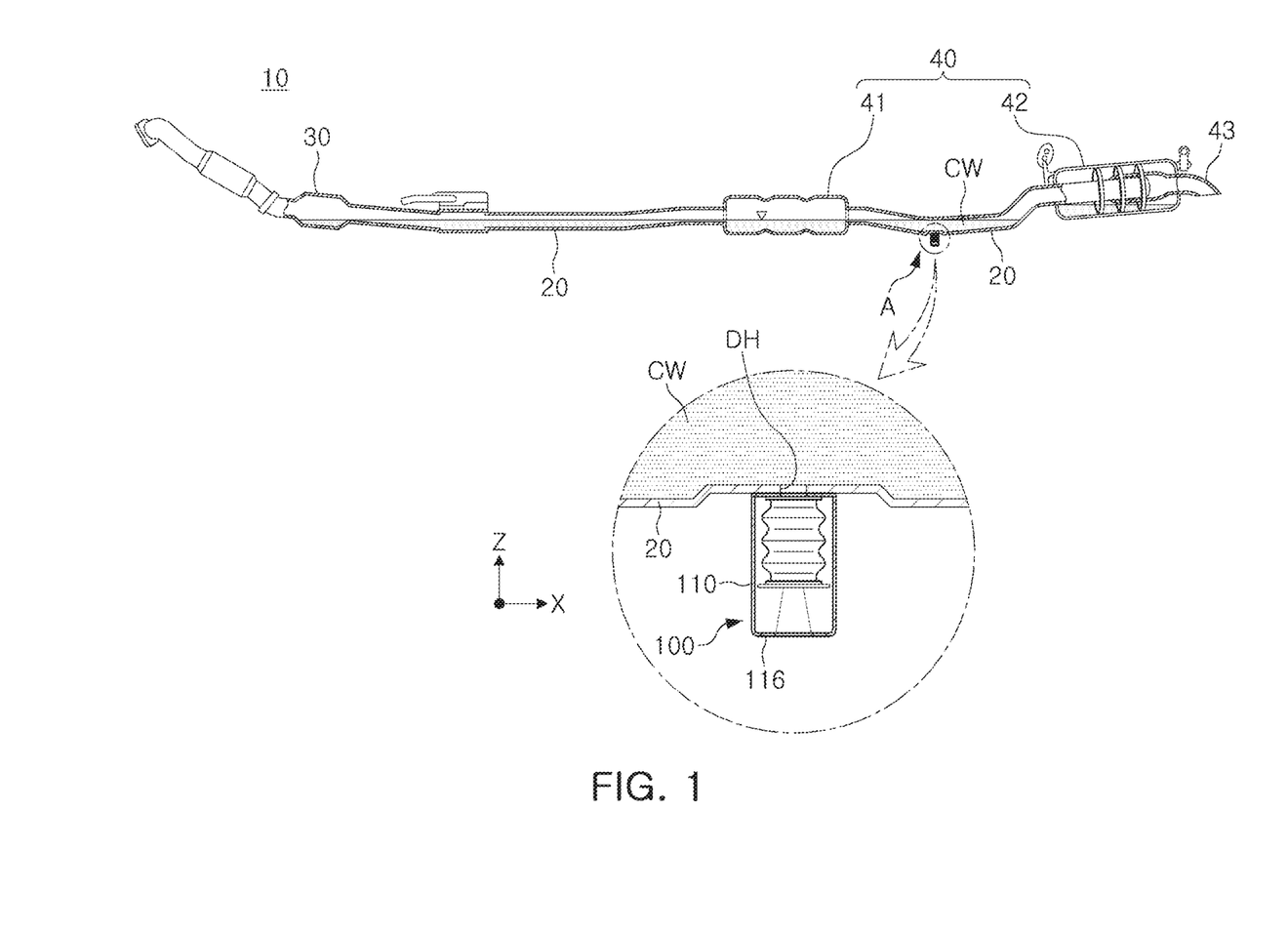
FIG. 1 is a schematic view illustrating an example of an exhaust system for a vehicle according to an embodiment of the present disclosure.
Figure 2:
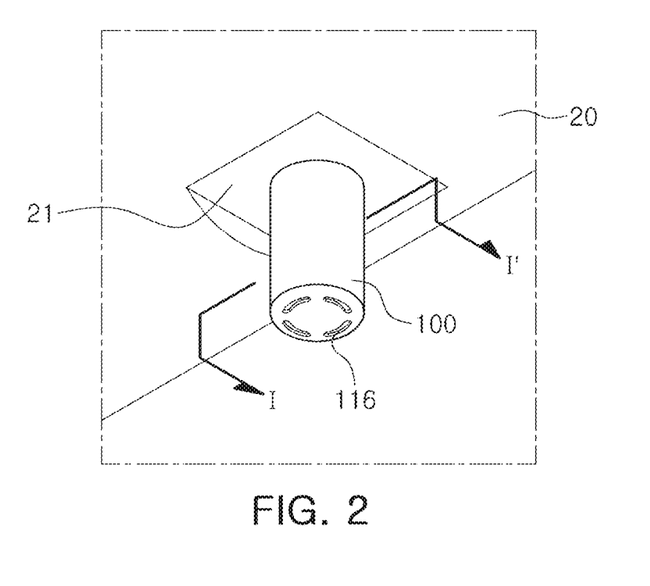
FIG. 2 is a perspective view of a condensed water drainage device illustrated in FIG. 1 mounted on an exhaust pipe.

First, an exhaust system 10 for a vehicle according to an aspect of the present disclosure is described with reference to FIGS. 1 and 2. FIG. 1 is a schematic view illustrating an example of the exhaust system 10 for a vehicle according to an embodiment of the present disclosure. FIG. 2 is a perspective view of a condensed water drainage device 100 illustrated in FIG. 1 mounted on an exhaust pipe 20. In the partially enlarged view of FIG. 1, the condensed water drainage device 100 illustrates an internal shape of the casing 110 in a cut-away state.

The exhaust system 10 for a vehicle according to an embodiment of the present disclosure may include the exhaust pipe 20 allowing exhaust gas discharged from an engine (not shown) to flow to a predetermined position in the vehicle. The exhaust system 10 may also include a muffler 40 installed in the exhaust pipe to lower pressure and temperature of the exhaust gas to reduce rapid expansion of the exhaust gas and exhaust noise. The exhaust system 10 may further include a condensed water drainage device 100 installed to drain condensed water formed in the exhaust pipe 20 and/or the muffler 40.

In addition, the exhaust system 10 according to an embodiment of the present disclosure may further include a catalytic converter 30 connected to the exhaust pipe 20 to remove harmful substances contained in the exhaust gas.

The muffler 40 may include a center muffler 41 located on an upstream side of the exhaust system 10 and a main muffler 42 located on a downstream side and connected to a tail pipe 43.

Harmful exhaust gas (HC, CO, etc.) discharged from the engine is converted into water vapor ($H_2O$), carbon dioxide ($CO_2$), etc. through the catalytic converter 30 so as to be drained. Here, vapor may be condensed to form condensed water. The condensed water inside the main muffler 42 may be drained externally from the main muffler through the tail pipe 43 by a discharge pressure (exhaust pressure) of the exhaust gas.

However, when the engine is idling, i.e., in a low revolutions per minute (RPM) region, discharge pressure is lowered, so that external draining of condensed water from the main muffler 42 is not smooth. When the idling state continues, the amount of condensed water inside the exhaust system 10 increases. In particular, when the vehicle is kept idling for a long time at a low outdoor temperature, condensed water CW generated in the mufflers 41 and 42 may overflow and a large amount of condensed water may gather in the exhaust pipe 20 at a lower end position A of the exhaust system. If condensed water CW accumulated in the exhaust pipe 20 freezes, a clogging phenomenon occurs in the exhaust pipe. In this case, it may be impossible to start an engine, defective starting may occur, or the exhaust system (muffler, etc.) may be deformed/damaged due to high exhaust pressure in the muffler.

In an embodiment of the present disclosure, the condensed water drainage device 100 for draining condensed water may be installed at a lower end region in a gravitation direction (a −Z direction).

The condensed water drainage device 100 may be installed in a position at which condensed water may gather, i.e., at a lowest position (A) of the exhaust system. For example, the condensed water drainage device 100 may be installed in a relatively lower position than other portions of the exhaust pipe 20. The lowest position (A) of the exhaust system may correspond to an exhaust pipe below a rear wheel suspension, but the position may be variously changed according to a layout of the exhaust system.

A drainage hole DH for externally discharging condensed water inside the exhaust pipe 20 may be formed in the exhaust pipe 20. The condensed water drainage device 100 may be installed on an outer surface of the exhaust pipe 20 to communicate with the drainage hole DH. Accordingly, when the exhaust gas is not discharged due to engine stop or when a discharge pressure of the exhaust gas is low due to idling or low-speed operation, condensed water flowing into the condensed water drainage device 100 may be drained out of the exhaust system through an outlet 116 of the casing 110.

In addition, for easy installation of the condensed water drainage device 100, a mounting surface 21 of the exhaust pipe 20 on which the casing 110 of the condensed water drainage device 100 is installed may form a flat surface.

Since the condensed water drainage device 100 is mounted on the exhaust pipe 20 from the outside of the exhaust pipe 20, installation of the condensed water drainage device 100 is facilitated. In addition, since the drainage hole DH is formed in the exhaust pipe 20 and condensed water discharge may be performed only by installing the condensed water drainage device 100, changes in the exhaust system for discharging condensed water may be minimized compared to the related art in which the condensed water drain structure is installed in the muffler.

In addition, since the drainage hole DH formed in the exhaust pipe 20 is covered through the condensed water drainage device 100 and is not exposed externally, user dissatisfaction may be resolved compared to the related art in which the drainage hole is exposed externally.

Meanwhile, in FIGS. 1 and 2, it is illustrated that the condensed water drainage device 100 is mounted on an outer surface (lower surface) of the exhaust pipe 20 so as to communicate with the drainage hole DH formed in the exhaust pipe 20. However, the condensed water drainage device 100 may also be mounted on an outer surface (lower surface) of at least one muffler 40 (41, 42) to communicate with a drainage hole formed in the muffler to drain condensed water accommodated in the muffler 40. Also, the condensed water drainage device 100 may be installed on both the outer surface of the exhaust pipe 20 and the outer surface of the muffler 40.

The condensed water drainage device 100 according to an embodiment of the present disclosure is described in more detail with reference to FIGS. 3-8. Hereinafter, a case in which the condensed water drainage device 100 is mounted on the exhaust pipe 20 is described. However, the condensed water drainage device 100 may also be mounted on the muffler.

Figure 3:
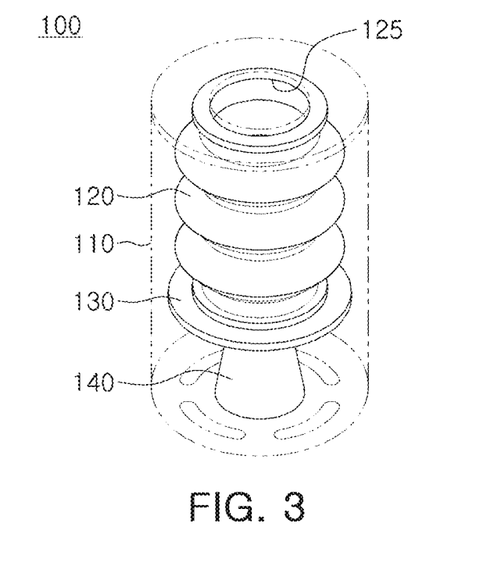
FIG. 3 is a top perspective view of a condensed water drainage device according to an embodiment of the present disclosure, in which a casing is projected.
Figure 4:
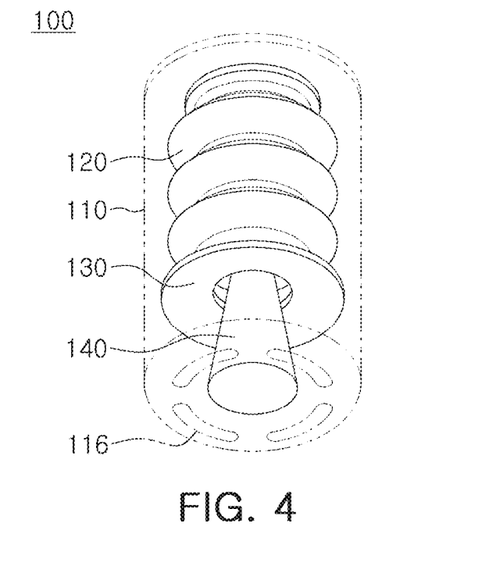
FIG. 4 is a bottom perspective view of the condensed water drainage device illustrated in FIG. 3, in which the casing is projected.
Figure 5:
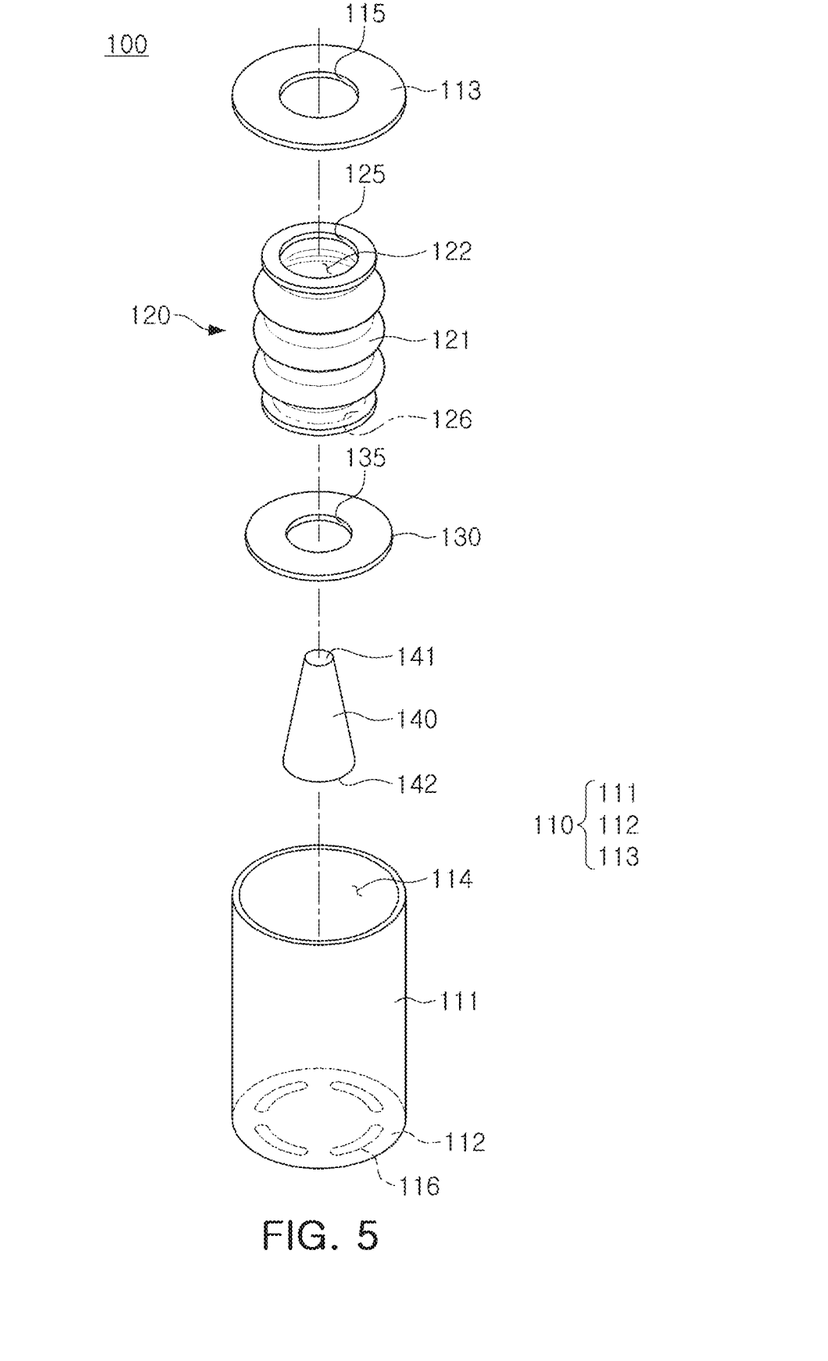
FIG. 5 is a top exploded perspective view of the condensed water drainage device illustrated in FIG. 3.
Figure 6A:
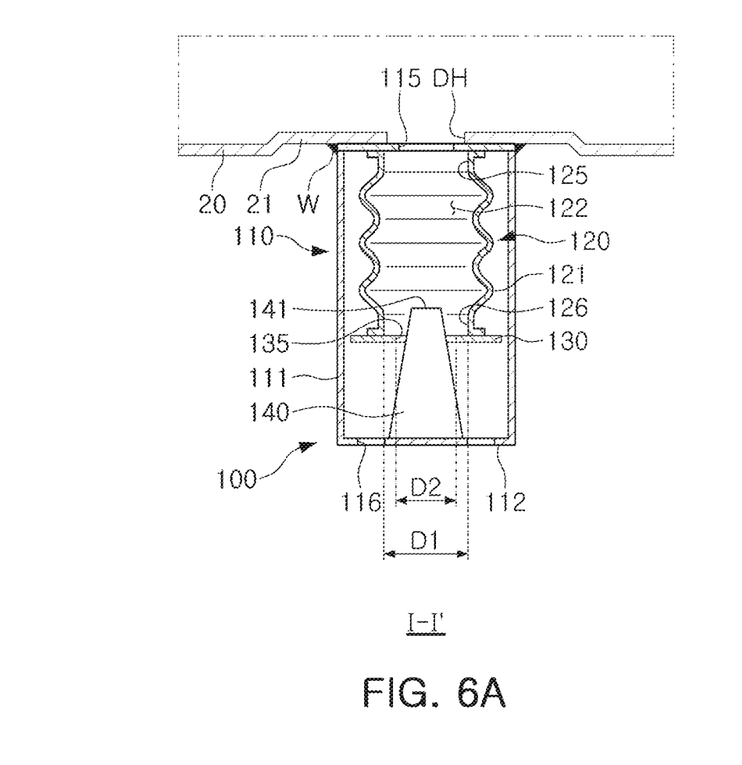
FIG. 6A is a cross-sectional view of a condensed water drainage hole in an open position and FIG. 6B is a cross-sectional view of the condensed water drainage hole in a closed position.
Figure 6B:
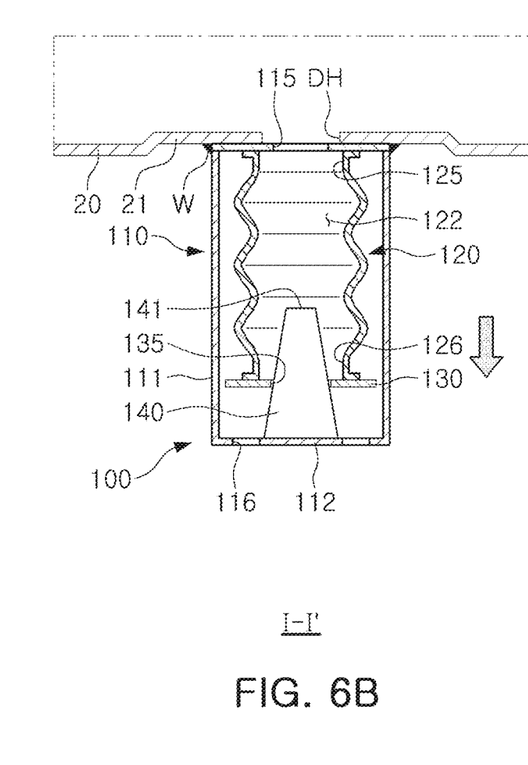
Figure 7A:
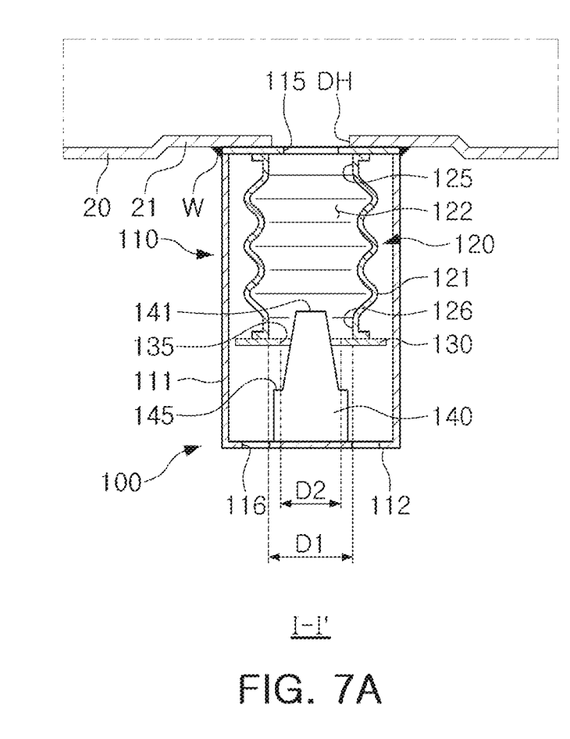
FIG. 7A is a cross-sectional view of a condensed water drainage hole in an open position and FIG. 7B is a cross-sectional view of the condensed water drainage hole in a closed position.
Figure 7B:
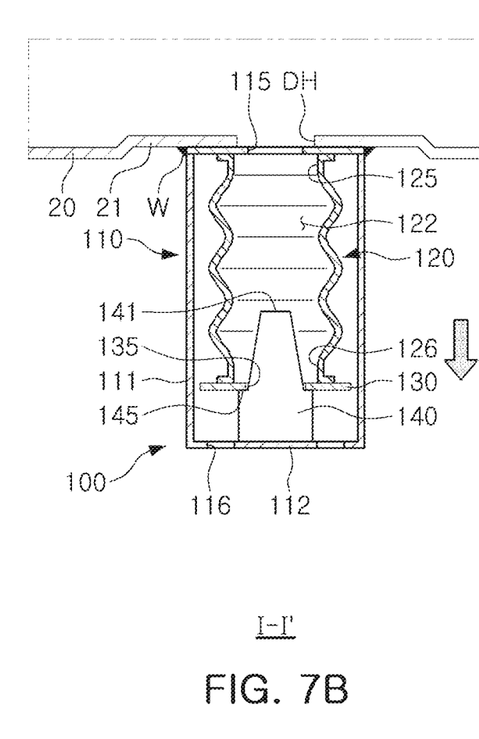
Figure 8A:
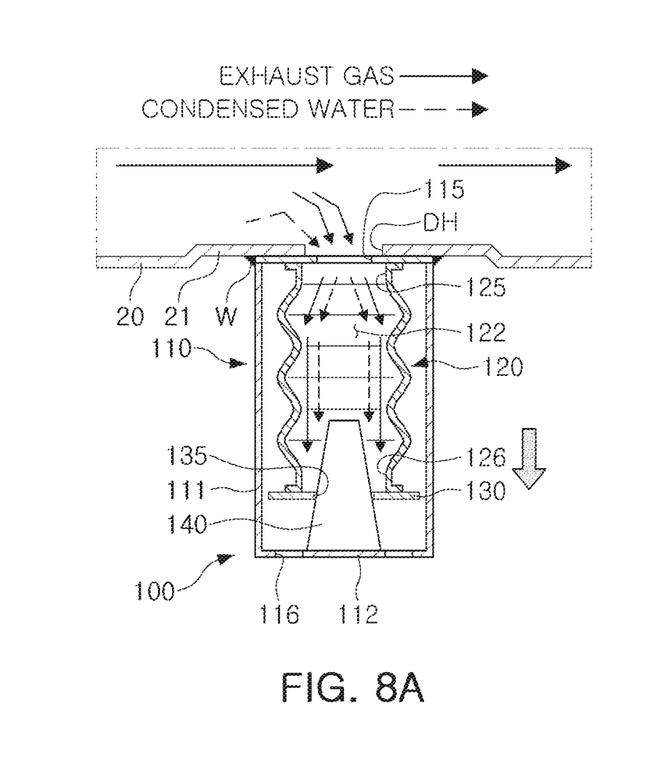
FIG. 8A is a cross-sectional view of a condensed water drainage hole in a closed position and FIG. 8B is a cross-sectional view of the condensed water drainage hole in an open position.
Figure 8B:
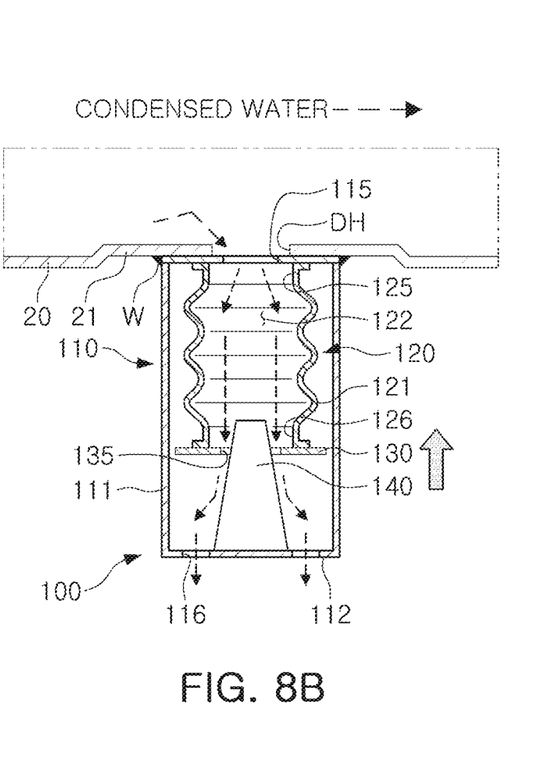

FIGS. 3 and 4 are top and bottom perspective views of the condensed water drainage device 100 according to an embodiment of the present disclosure, respectively, illustrating the casing 110 in a projected state. FIG. 5 is an exploded perspective view illustrating a state in which the condensed water drainage device 100 illustrated in FIG. 3 is viewed from an upper side. FIGS. 6A and 6B are cross-sectional views of the condensed water drainage device 100 taken along line I-I' of FIG. 2. FIG. 6A is a cross-sectional view of a condensed water drainage hole 135 in an open position and FIG. 6B is a cross-sectional view of the condensed water drainage hole 135 in a closed position. FIGS. 7A and 7B are cross-sectional views illustrating a modified example of the condensed water drainage device 100 illustrated in FIGS. 6A and 6B. FIG. 7A is a cross-sectional view of the condensed water drainage hole 135 in an open position and FIG. 7B is a cross-sectional view of the condensed water discharge hole 135 in a closed position. FIGS. 8A and 8B are views illustrating an operational state of the condensed water drainage device 100 according to an embodiment of the present disclosure. FIG. 8A is a view illustrating an operational state of the condensed water drainage hole 135 in a closed position and FIG. 8B is a view illustrating an operational state of the condensed water drainage hole 135 in an open position.

Referring to FIGS. 3-5, the condensed water drainage device 100 according to an embodiment of the present disclosure may include: a casing 110 having an inlet 115 and an outlet 116 formed therein; a deformable member 120 coupled to a first side of the casing 110 and being contracted and extended; a condensed water drainage member 130 coupled to the deformable member 120 and having a condensed water drainage hole 135; and a stopper 140 restricting movement of the condensed water drainage member 130.

The casing 110 may form an exterior of the condensed water drainage device 100. As an example, the casing 110 may include a main body 111 having a bottom portion 112 and a pipe-shaped side portion and having an open upper side and a cover portion 113 covering the open upper end of the main body 111. The main body 111 and the cover portion 113 may be integrated by a known bonding method such as welding. However, a divided structure of the casing 110 is not limited thereto. The bottom portion 112 and the side portion constituting the main body 111 may be separately configured and then joined. An accommodation space 114 accommodating the deformable member 120, the condensed water drainage member 130, and the stopper 140 may be formed inside the casing 110 by the combination of the main body 111 and the cover portion 113.

The inlet 115 through which condensed water and exhaust gas are introduced may be formed on a first side (upper portion) of the casing 110. The outlet 116 for draining condensed water may be formed on a second side (lower portion) of the casing 110. For example, the inlet 115 communicating with the drainage hole DH (of FIG. 1) may be formed in the cover portion 113 and the outlet 116 may be formed in the bottom portion 112.

The casing 110 may have a hollow cylindrical shape, but the shape is not limited thereto.

Meanwhile, the casing 110 may have a thickness (e.g., 1 mm or more) having sufficient rigidity because the casing 110 is installed on an outer surface of the exhaust pipe 20 and the like. In addition, the casing 110 may be formed of a corrosion-resistant material such as stainless steel or coated with a corrosion-resistant material (including plating) in order to prevent corrosion due to contact with condensed water and/or exhaust gas.

The deformable member 120 may be coupled to the first side of the casing 110 and elastically deformed according to an increase or decrease of exhaust gas pressure. The deformable member 120 may be bonded and fixed to a lower surface of the cover portion 113 of the casing 110 by a known bonding means such as welding or the like.

In addition, the deformable member 120 may be contracted and extended in a longitudinal direction when pressure of an exhaust gas increases. When the pressure of the exhaust gas decreases or is less than a certain level, the deformable member 120 may contract in the longitudinal direction by its own elastic force and return to its original length. As an example, the deformable member 120 may have a corrugated tube shape having troughs and ridges, such as a bellows, to facilitate flexible deformation and elastic deformation. The deformable member 120 may be formed of a thin plate (e.g., a thickness of about 0.5 mm) so that the deformable member 120 is easily flexibly deformed.

The deformable member 120 may include a hollow body 121 in which a first opening 125 communicating with the inlet 115 of the casing 110 is formed on one side (upper portion) and a second opening 126 is formed on the other side (lower portion). The body 121 may have a hollow pipe shape and an internal space 122 into which exhaust gas and/or condensed water is introduced. The deformable member 120 may be formed of a corrosion-resistant material such as stainless steel or coated with a corrosion-resistant material (including plating) to prevent corrosion due to contact with condensed water and/or exhaust gas flowing into the internal space 122.

The condensed water drainage member 130 may be coupled to a lower portion of the deformable member 120. A known bonding method such as welding may be used for bonding the condensed water drainage member 130 to the deformable member 120. The condensed water drainage member 130 may be installed to be movable in an up-down direction in the accommodation space 114 of the casing 110 according to elongation of the deformable member 120.

In addition, the condensed water drainage member 130 may have a condensed water drainage hole 135 communicating with the outlet 116 of the casing 110. Accordingly, when the condensed water drainage hole 135 is opened, condensed water may be drained externally through the condensed water drainage hole 135 and the outlet 116. The condensed water drainage member 130 may be formed of a corrosion-resistant material such as stainless steel or may be coated with a corrosion-resistant material (including plating) in order to prevent corrosion due to contact with condensed water and/or exhaust gas.

The stopper 140 may be coupled and fixed to the second side (lower portion) of the casing 110. For example, the stopper 140 may be fixed to the bottom portion 112 of the casing 110 through well-known bonding member such as press fitting, screwing, or a pin coupling. The stopper 140 may be configured to block the condensed water drainage hole 135 when the deformable member 120 and the condensed water drainage member 130 coupled thereto move downward by pressure of the exhaust gas to limit further movement of the condensed water drainage member 130. As an example, the stopper 140 may have a shape of a truncated cone having a narrow upper portion 141 and a wide lower portion 142. However, the shape of the stopper 140 is not limited to the truncated cone and may vary as long as it can limit the movement of the condensed water drainage member 130.

The stopper 140 may be formed of a polymer material to reduce noise occurring due to contact with the condensed water drainage member 130 and may be formed of a heat-resistant material (e.g., heat-resistant temperature of 200° C. or higher) to withstand high temperature exhaust gases. For example, the stopper 140 may be formed of a high heat-resistant polymer or rubber material.

Referring to FIGS. 6A and 6B, the casing 110 of the condensed water drainage device 100 may be mounted on the mounting surface 21 of the pipe member 20 and may be fixed to the pipe member 20 by a bonding portion W such as welding or the like.

The drainage hole DH is formed in the mounting surface 21, and the inlet 115 of the casing 110 communicates with the drainage hole DH. The upper side of the deformable member 120 is fixed to the upper portion of the casing 110, and the first opening 125 is configured to communicate with the drainage hole DH and the inlet 115. The condensed water drainage member 130 is coupled to a lower side of the deformable member 120. The second opening 126 of the deformable member 120 communicates with the condensed water drainage hole 135. In order to prevent noise occurrence due to contact between the condensed water drainage member 130 and the casing 110, an outer circumferential surface of the condensed water drainage member 130 has a structure spaced apart from an inner circumferential surface of the casing 110 by a predetermined distance.

The stopper 140 is fixedly installed on the bottom portion 112 of the casing 110 and the outlet 116 through which condensed water is drained externally may be formed around the stopper 140 in the bottom portion 112.

The internal space 122 is formed inside the body 121 of the deformable member 120 into which exhaust gas and/or condensed water may be introduced through the drainage hole DH and the inlet 115.

FIG. 6A illustrates a state in which an exhaust gas is not introduced into the internal space 122 or pressure of the exhaust gas is lower than a set value. In this case, the deformable member 120 contracts in the longitudinal direction, and a space is formed between the condensed water drainage hole 135 and the stopper 140. Accordingly, condensed water introduced into the internal space 122 may flow down through the condensed water drainage hole 135.

In the state of FIG. 6A, when exhaust gas flows into the internal space 122 through the inlet 115 and the first opening 125, the condensed water drainage member 130 may resist flow of the exhaust gas and move downward by the pressure of the exhaust gas. Accordingly, the deformable member 120 to which the condensed water drainage member 130 is coupled may be extended while moving in the downward direction together with the condensed water drainage member 130. In other words, the condensed water drainage member 130 may be configured to extend the deformable member 120 by the pressure of the exhaust gas introduced into the internal space 122 of the deformable member 120. Accordingly, as illustrated in FIG. 6B, the condensed water drainage member 130 moves downward to come into contact with the stopper 140. Thus, the condensed water drainage hole 135 is closed by the stopper 140, thereby blocking draining of the exhaust gas through the condensed water drainage hole 135.

Here, in order for the condensed water drainage member 130 to easily move in the downward direction by receiving force by the pressure of the exhaust gas, and to receive a greater force by the pressure of the exhaust gas, the condensed water drainage member 130 may have a shape partially covering the second opening 126 of the deformable member 120. In other words, a diameter D2 of the condensed water drainage hole 135 may be smaller than a diameter D1 of the second opening 126. The exhaust gas of the internal space 122 may thereby apply pressure to a larger area of the condensed water drainage member 130.

Meanwhile, in the engine stop or idling state, pressure of the exhaust gas may not act or may be reduced below a certain value, and accordingly, the pressure of the internal space 122 is also lowered. In this case, the force acting on the condensed water drainage member 130 by the exhaust gas is smaller than the elastic force of the deformable member 120. Thus, the length of the deformable member 120 is contracted and the condensed water drainage member 130 moves upwardly. Accordingly, as illustrated in FIG. 6A, the condensed water drainage member 130 may move upwardly and the condensed water discharging hole 135 may be open.

As such, the condensed water drainage member 130 may be configured to move between an open position (FIG. 6A) and a closed position (FIG. 6B). In the open position, the condensed water drainage member 130 is spaced apart from the stopper 140 and the condensed water drainage hole 135 is at least partially opened. In the closed position, the condensed water drainage member 130 is in contact with the stopper 140 and the condensed water drainage hole 135 is closed. In the open position, condensed water drained through the condensed water drainage hole 135 may be drained externally through the outlet 116. In the closed position, the condensed water drainage hole 135 is closed, so exhaust gas and condensed water are not drained through the condensed water drainage hole 135.

In the open position, the stopper 140 may have a structure in which the upper portion 141 is inserted into the condensed water drainage hole 135. Therefore, when the condensed water drainage member 130 moves from the open position to the closed position, the inner circumferential surface of the condensed water drainage member 130 may be guided by the stopper 140. In this way, a phenomenon in which the condensed water drainage member 130 fluctuates in a horizontal direction may be minimized and the condensed water drainage member 130 may be stably moved in the downward direction. In other words, the stopper 140 may function to prevent contact noise by minimizing contact between the outer circumferential surface of the condensed water drainage member 130 and the inner circumferential surface of the casing 110 when the condensed water drainage member 130 is moved.

In addition, a lower portion of the stopper 140 exposed externally from the condensed water drainage hole 135 may have a sectional area greater than an upper portion thereof inserted into the condensed water drainage hole 135 to limit movement of the condensed water drainage hole 135 in the downward direction.

FIGS. 7A and 7B illustrate a modified example of the condensed water drainage device 100 illustrated in FIGS. 6A and 6B. The condensed water drainage device 100 illustrated in FIGS. 7A and 7B has the same configuration as the condensed water drainage device 100 illustrated in FIGS. 6A and 6B, except that a step portion 145 is formed in the stopper 140. Thus, the same reference numerals are given to the same or corresponding components as those of FIGS. 6A and 6B, and the description of each component with respect to FIGS. 7A and 7B is the same as the description of FIGS. 6A and 6B in order to avoid unnecessary repeated description.

The stopper 140 illustrated in FIGS. 7A and 7B includes the step portion 145 having a planar shape. Accordingly, the condensed water drainage member 130 may be in surface contact with the step portion 145. Therefore, compared with FIGS. 6A and 6B having a structure in which the outer surface of the stopper 140 and the condensed water drainage hole 135 of the condensed water drainage member 130 are in line contact with each other, the embodiment of FIGS. 7A and 7B may more stably block external draining of exhaust gas in the closed position.

Finally, an operation of the condensed water drainage device 100 according to an embodiment of the present disclosure is described with reference to FIGS. 8A and 8B.

As illustrated in FIG. 8A, when the exhaust gas flowing through the exhaust pipe 20 is introduced into the internal space of the deformable member 120 through the drainage hole DH, the inlet 115, and the first opening 125, the deformable member 120 is extended in the longitudinal direction by a discharge pressure of the exhaust gas. Accordingly, the condensed water drainage member 130 is moved downwards so as to come into contact with the stopper 140. When the condensed water drainage hole 135 is blocked by the stopper 140, draining of the exhaust gas and condensed water through the condensed water drainage hole 135 may be prevented.

In the case of the related art in which only a drainage hole is formed in an exhaust pipe, noise vibration may occur due to external leakage of exhaust gas through the drainage hole during engine operation. However, in the embodiment of the present disclosure, since the condensed water drainage hole 135 is closed, the exhaust gas generated during engine operation does not leak to the outside of the condensed water drainage device 100. Thus, an occurrence of noise vibration due to leakage of the exhaust gas may be minimized even when the drainage hole DH is formed.

Meanwhile, as illustrated in FIG. 8B, when the engine is stopped and exhaust gas is not generated, the deformable member 120 is contracted in the longitudinal direction by an elastic restoring force of the deformable member 120. In this case, the deformable member 120 and the condensed water drainage member 130 coupled thereto move upwardly and a space is formed between the condensed water drainage hole 135 and the stopper 140. Thus, condensed water may be drained through the condensed water drainage hole 135 and the outlet 116. In other words, when the engine is stopped or not running, condensed water gathering in the exhaust pipe 20 is naturally drained. Therefore, even if a large amount of condensed water is generated, the condensed water is naturally drained after the engine is stopped. Thus, clogging of the exhaust pipe due to freezing of the condensed water may be prevented even if the outside air temperature is low in the winter or in a cold area.

As set forth above, according to embodiments of the present disclosure having such a configuration, condensed water may be easily drained externally from an exhaust system, thereby preventing clogging of the exhaust pipe due to frozen condensed water, as well as reducing noise and vibration during an engine operation.

In addition, according to embodiments of the present disclosure, since the condensed water drainage device is mounted on the outside of the exhaust system, changes to the exhaust system may be minimized and the condensed water drainage device may be easily installed.

While example embodiments have been shown and described above, it should be apparent to those having ordinary skill in the art that modifications and variations can be made without departing from the scope of the present disclosure as defined by the appended claims.

What is claimed is:

1. A condensed water drainage device of an exhaust system, the condensed water drainage device comprising:
a casing having an inlet on a first side thereof and an outlet on a second side thereof wherein the casing is mounted on at least one of an outer surface of an exhaust pipe or an outer surface of a muffler, and wherein the inlet communicates with a drainage hole formed on an outer surface of the muffler or the exhaust pipe;
a deformable member coupled to the first side of the casing and configured to elastically and extendably deform, the deformable member having an internal space into which exhaust gas is introduced;
a condensed water drainage member coupled to the deformable member to extend the deformable member by pressure of an exhaust gas introduced to the internal space of the deformable member, the condensed water drainage member having a condensed water drainage hole communicating with the outlet; and
a stopper coupled to the second side of the casing to limit movement of the condensed water drainage member and to open or close the condensed water drainage hole according to extension or contraction of the deformable member.

2. The condensed water drainage device of claim 1, wherein one side of the deformable member and the stopper are fixed to the casing and wherein the condensed water drainage member is movably accommodated in the casing.

3. The condensed water drainage device of claim 1, wherein the condensed water drainage member moves between an open position in which the condensed water drainage member is spaced apart from the stopper and the condensed water drainage hole is at least partially opened and a closed position in which the condensed water drainage member is in contact with the stopper and the condensed water drainage hole is closed, and
wherein, in the open position, condensed water drained through the condensed water drainage hole is drained externally through the outlet.

4. The condensed water drainage device of claim 1, wherein the deformable member has a corrugated tube shape.

5. The condensed water drainage device of claim 1, wherein the deformable member has a first opening formed on one side thereof and communicating with the inlet and a second opening formed on the other side thereof, and wherein the condensed water drainage member has a shape partially covering the second opening.

6. The condensed water drainage device of claim 5, wherein the condensed water drainage hole has a diameter smaller than a diameter of the second opening.

7. The condensed water drainage device of claim 3, wherein one side of the stopper is inserted into the condensed water drainage hole in the open position.

8. The condensed water drainage device of claim 7, wherein a portion of the stopper exposed to the outside of the condensed water drainage hole has a sectional area greater than a sectional area of one side of the stopper inserted into the condensed water drainage hole.

9. The condensed water drainage device of claim 3, wherein the stopper has a step portion so as to be in surface contact with the condensed water drainage member in the closed position.

10. The condensed water drainage device of claim 1, wherein at least one of the deformable member, the casing, or the condensed water drainage member is formed of a corrosion-resistant material or is coated with a corrosion-resistant material.

11. The condensed water drainage device of claim 1, wherein the stopper is formed of a heat-resistant polymer.

12. An exhaust system for a vehicle, the exhaust system comprising:
an exhaust pipe through which exhaust gas discharged from an engine can flow;
a muffler connected to the exhaust pipe and configured to reduce exhaust noise; and
a condensed water drainage device mounted on at least one of an outer surface of the exhaust pipe or an outer surface of the muffler and installed to communicate with a drainage hole formed in the muffler or the exhaust pipe to drain condensed water,
wherein the condensed water drainage device includes
a deformable member having an internal space into which exhaust gas is introduced and being elastically extendable according to pressure of an exhaust gas introduced in the internal space,
a condensed water drainage member coupled to the deformable member and having a condensed water drainage hole, and
a stopper opening or closing the condensed water drainage hole according to extension or contraction of the deformable member.

13. The exhaust system of claim 12, wherein the drainage hole is formed in a position of the exhaust pipe lower than other portions thereof.

14. The exhaust system of claim 13, wherein a mounting surface of the exhaust pipe on which the condensed water drainage device is installed forms a flat surface.

* * * * *